Figure 2:
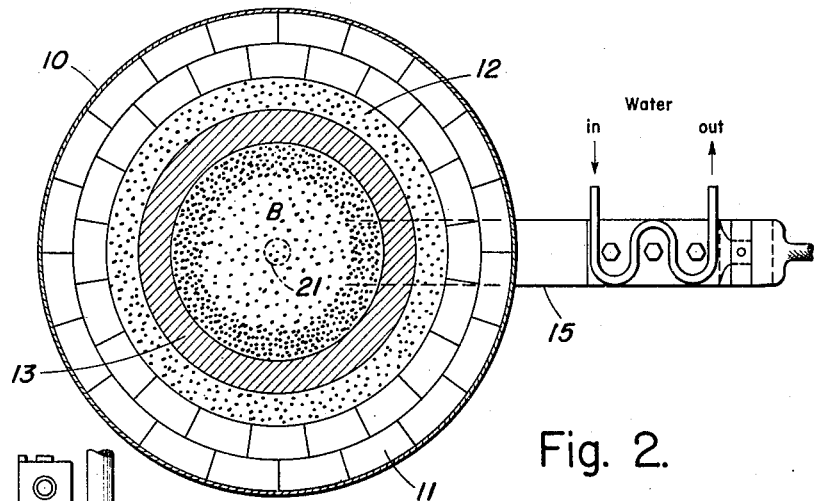

June 8, 1954  D. L. ARMANT ET AL  2,680,681
PREPARATION OF TITANIUM SLAG COMPOSITION
Filed March 5, 1953

INVENTORS
David L. Armant
Harold S. Sigurdson
BY
Charles F. Kargebehn
ATTORNEY

Patented June 8, 1954

2,680,681

UNITED STATES PATENT OFFICE 2,680,681

PREPARATION OF TITANIUM SLAG COMPOSITION

David Leon Armant, Dunellen, and Harold S. Sigurdson, Metuchen, N. J., assignors to National Lead Company, New York, N. Y., a corporation of New Jersey Application March 5, 1953, Serial No. 340,542

3 Claims. (Cl. 75—11)

The present invention relates in general to the beneficiation of titaniferous iron ores and more especially to an improved method and means for producing a substantially iron free slag having a high concentration of highly reduced titanium values for use as a feed material in the production of titanium tetrachloride.

By far, the most direct and economical method for producing titanium tetrachloride is by chlorination of natural rutile ore which because of its high titanium content and low percentage of iron may be chlorinated readily at relatively low temperatures to produce large volumes of titanium tetrachloride per unit volume of ore. However, due to the current widespread interest in the production of titanium metal by reduction of gaseous titanium tetrachloride, huge demands have been made upon known sources of rutile ore with the result that rutile ore is not only scarce but has more than doubled in its cost per ton.

Some work has been done heretofore in smelting titaniferous iron ores such as, for example, ilmenite, to recover the iron values substantially free of titanium; or for reducing the iron to the metallic state without reduction of the titanium values. Moreover, attempts have been made to beneficiate ilmenite ore by smelting the ore with carbon and a fluxing agent to produce chlorinatable feed material. However, the addition of fluxing agents has been found undesirable in that the fluxes not only increase the cost of the operation but also dilute and contaminate the titaniferous slag so that the latter is unsuitable for chlorination.

In order to provide a feed material which may be readily chlorinated at relatively low temperatures to produce titanium tetrachloride, the feed material must not only be substantially free of iron and fluxing agents, but the titanium values in the feed material should be reduced as nearly as possible to an oxy carbide Ti(OC) in which the carbon and oxygen are present in stoichiometric ratio whereby a minimum amount of additional carbon will be required during subsequent chlorination of the feed material.

An object, therefore, of the present invention is to provide an improved method for treating titaniferous iron ores to proruce a relatively inexpensive and highly productive feed material for use in the manufacture of titanium tetrachloride.

A further object of the invention is to provide an improved method for beneficiating ilmenite ore, both to reduce the iron and titanium values and to selectively separate the reduced iron values from the reduced titanium values.

A still further object of the invention is to provide an improved process for smelting ilmenite ore to produce a substantially iron-free, flux-free slag which has a high concentration of highly reduced titanium values which may be chlorinated at relatively low temperatures with minimum addition of a carbonaceous reducing agent to produce gaseous titanium tetrachloride.

These and other objects, features and advantages of the invention will be further apparent to those skilled in the art from the following description of the invention.

In its broadest aspects, the present invention relates to an improved process and means for forming a substantially iron-free highly reduced titaniferous slag by smelting a charge of titaniferous iron ore with a carbonaceous reducing agent in an amount sufficient, at the smelting temperature employed, both to accomplish substantially complete separation of the iron values as metallic iron from the titaniferous slag, and to effect extensive reduction of the titanium values in the slag to the reduced oxides of titanium.

The phrases "reduced oxides of titanium," "highly reduced titanium slags," and slags having "highly reduced titanium values," as used herein, shall be understood to have reference to and to be inclusive of titanium oxides represented by the formulae TiO and $Ti_2O_3$ as well as the oxy carbide of titanium identified by the formula Ti(OC).

The term "carbonaceous reducing agent" shall have reference herein to any suitable carbonaceous material, preferably a solid material such as coke, and for brevity the carbonaceous reducing agent will be referred to hereinafter as coke although it will be understood that other solid carbonaceous materials may be used.

As pointed out above, the requirements for an inexpensive highly productive feed material for use in the manufacture of titanium tetrachloride are that it shall be substantially free of iron and fluxing agents, that it have a high concentration of highly reduced titanium values, and that the oxygen and carbon be as nearly as possible in stoichiometric ratio so as to preclude the necessity for the addition of carbon during chlorination of the feed material.

The present invention is based on the discovery that in order to reduce the iron values in an ilmenite ore to metal in the form which may be readily separated from the titaniferous slags, and to reduce the titanium values in the slag as nearly as possible to the oxy carbide, the ratio of the ore to coke must be maintained within a critical range at the temperatures employed for smelting the mixture of ore and coke.

It has been found that these principal objectives, namely the reduction of the iron values to metal and the reduction of the titanium values to oxy carbides of titanium, conflict with respect to the optimum coke addition. Thus, insofar as the reduction of the iron values is concerned, it is only necessary to add sufficient coke to reduce the iron values to metal. By way of example, in order to reduce the iron values of an ilmenite ore to metallic iron, from 8 to 12 parts coke per 100 parts ore may be required. Under these conditions the slag formed by heating the mixture of ore and coke will be in a fluid condition, and hence the metallic iron will be free to coalesce and separate out from the slag as a pool of molten metallic iron. Moreover, due to the high specific gravity of the molten iron, the latter tends to accumulate in the form of a molten pool beneath the surface of the fluid slag.

However, to achieve effective reduction of the titanium values in an ilmenite ore, it is necessary to add to the ore sufficient carbon, in the form of coke, to combine with substantially all of the oxygen of titanium values. By way of example, for an ilmenite ore from 17 to 25 parts coke may be required for reducing the titanium values alone. Thus, it is evident that considerably more coke is required theoretically for complete reduction of the titanium values alone than is required for reducing the iron values alone to metallic iron.

If the sum of the amounts of coke required for reducing both the iron and titanium values is admixed with the ilmenite ore, both the iron values and titanium values will be reduced substantially simultaneously with the result that the titaniferous slag will become highly viscous, thereby preventing coalescence and separation of the metallic iron from the slag.

Although efforts have been made to reduce the iron values and the titanium values successively by first adding only enough coke to reduce the iron values to molten metallic iron and subsequently adding additional coke to the fluid slag to reduce the titanium values, it has been found that the subsequent addition of only a relatively small amount of coke to the fluid slag may form a crust on the surface of the slag, as a consequence of which the main body of the slag is not wholly reduced; or when no surface crust is formed, then excessive amounts of carbon are required to reduce the titanium values in the slag.

The present invention embraces the discovery that in actual smelting operations effective reduction of both the iron values and the titanium values in an ilmenite ore may be achieved substantially concurrently by the use of from about 17 to 25 parts coke per 100 parts of ore.

The titaniferous iron ores used in carrying out the process of this invention may comprise one or more grades of ilmenite ore, at least two of which are sometimes referred to in the industry as Quilon and MacIntyre ores having the following analysis:

|  | Quilon | MacIntyre |
| --- | --- | --- |
| $TiO_2$ | 59.1 | 44.9 |
| FeO | 12.4 | 38.5 |
| $Fe_2O_3$ | 24.0 | 5.7 |
| Fe (total) | 26.4 | 33.9 |
| CaO | 0.1 | 0.8 |
| MgO | 0.9 | 3.2 |
| $Al_2O_3$ | 1.2 | 2.1 |
| $SiO_2$ | 0.7 | 3.8 |

Quilon ilmenite ore occurs in nature as a beach sand having a particle size of about minus 50 mesh while the MacIntyre ilmenite ore as used in the smelting operation of this invention is produced by crushing, grinding, magnetic separation, and flotation operations and has a particle size of about minus 30 mesh.

The carbonaceous reducing agent used in the smelting operation is preferably coke analyzed as comprising:

Total carbon — 90.6%, Hydrogen — 1.9%, Ash — 6.6% and is crushed to a particle size of about minus 10 mesh.

Figure 1:
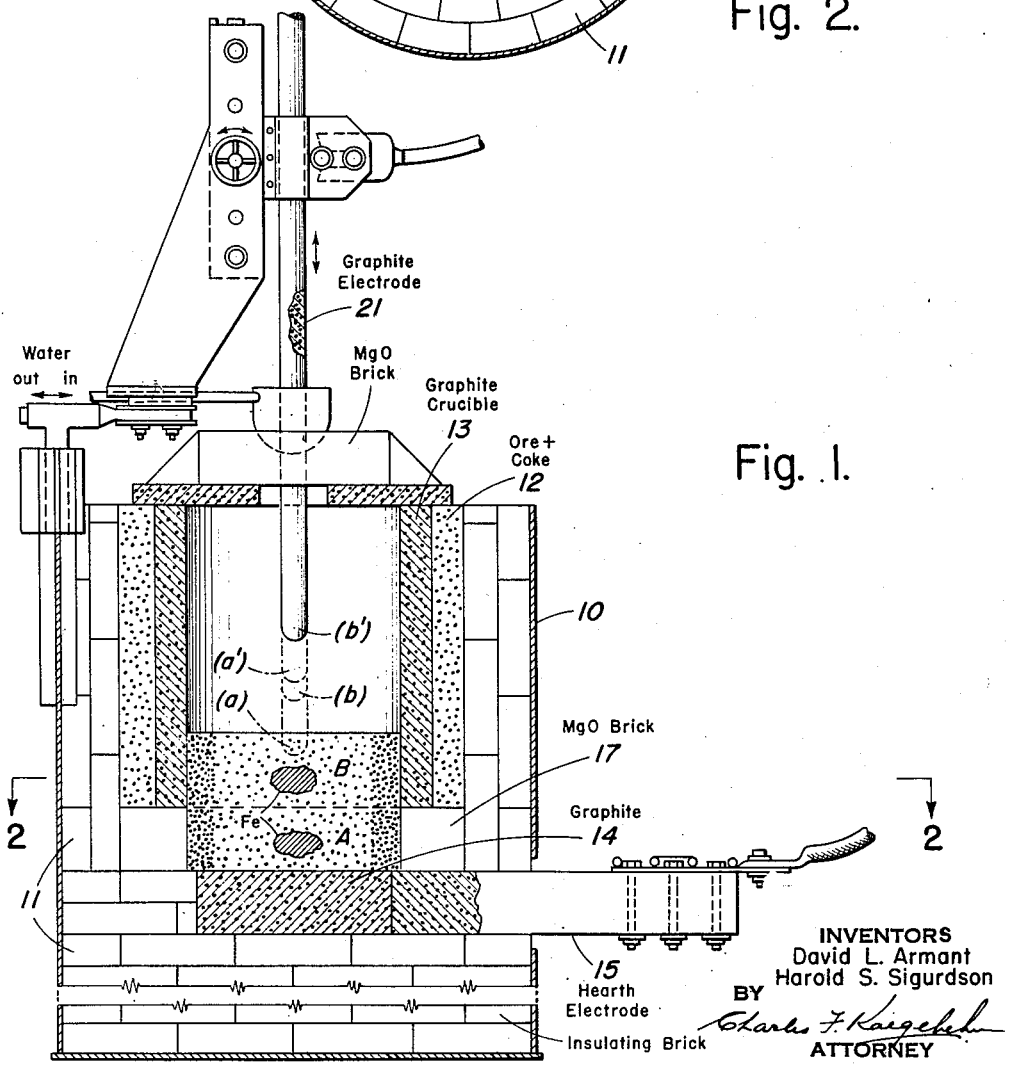

The preparation of a highly reduced slag by smelting a mixture of ilmenite ore and carbon in the critical proportions specified above is preferably carried out in a single phase alternating current electric furnace, such as shown in Figure 1 of the drawings, wherein 10 represents an outer shell formed of steel plate or equivalent material and provided with an insulating brick lining indicated generally at 11 which defines the bottom and side walls respectively of a chamber 12 within which the crucible 13 of the furnace is mounted. Recessed in the bottom of the chamber 12 is a disc shaped block 14 of graphite which comprises the inner end of an integral graphite slab hearth-electrode, the outer end of which comprises a graphite bar 15 which projects radially outwardly from the furnace, and is connected at its outer extremity to an alternating current conductor 16.

The aforesaid crucible 13 of the furnace is a hollow graphite cylinder which is supported above and electrically insulated from the graphite slab hearth-electrode by an annulus 17 formed of magnesium oxide bricks. The latter serves to insulate the crucible wall from the hearth electrode and in this manner prevents short circuiting of the arc to the crucible wall. The overall diameter of the crucible is less than the inside diameter of the chamber 13 so as to provide an annular wall space between the latter and the outer wall of the crucible. This annular wall space may be filled with an insulating material 18 which may comprise any suitable insulation material but is preferably a mixture of unreacted coke and slag such as remains in the crucible at the conclusion of each heating cycle. The crucible cover 19 comprises slabs of graphite and may be insulated with a layer of magnesium oxide brick 20.

Extending through the cover 19 is an arcing electrode 21 which comprises a graphite rod insulated from the cover by a water cooled gland 22. To take into account the characteristic change in electrical conductivity of the feed material with reduction of its iron and titanium values, the electrode 21 is supported for vertical adjustment towards and away from the graphite hearth-electrode and to this end is secured at its upper end in a clamp 23 to which the other terminal 24 of the alternating current supply is connected. The clamp 23 is provided with rack teeth (not shown) and is slidably mounted in vertical ways of a bracket 25 which is fixedly supported on the furnace casing. A hand operated pinion, indicated generally by the hand wheel 26, is mounted on the fixed bracket 25 and arranged to engage the rack teeth of the clamp 23 so as to raise and lower the electrode 21 relative to the graphite hearth-electrode 14.

In this connection it should be pointed out that the resistance of the feed material varies with the degree of reduction of the fluid slag. Thus, the fluid slag formed by a fresh charge of feed material will be high in oxygen content and hence offer high resistance to the passage of current therethrough whereas as the slag becomes more fully reduced, its resistance decreases. Therefore, in order to maintain substantially constant electrical resistance, it is necessary to effect an increase in the width of the arc gap from a relatively small arc gap for each fresh charge, to an increasingly larger arc gap as the fluid slag is reduced.

In preparing a highly reduced titaniferous slag by the process of this invention, the electric arc furnace is preheated preferably by charging a relatively small amount of ore and coke into the furnace and then arcing the alternating current between the movable electrode 21 and the mixture of ore and coke for a period sufficient to raise the furnace temperature to about 1800° C. The feed material used to preheat the furnace may be the same mixture of coke and ore as used for subsequently charging the furnace and comprises ilmenite ore and coke in the critical ratio of from 17 to 25 parts coke per 100 parts ore, the ore having a particle size within the range of from minus 30 to minus 50 mesh and the coke having a particle size of about minus 10 mesh.

After the furnace temperature has reached about 1800° C., the feed material is charged into the furnace in successive increments, the time interval between successive charges of feed material being preferably such that the iron values of each new charge are completely reduced and separate out and coalesce in the form of a molten globule of iron beneath the surface of the slag before the next succeeding charge is added. In this manner and while maintaining the furnace temperature at from 1800° C. to 2000° C. successive charges of feed material are fed to the furnace until the capacity of the latter is reached at which time heating is discontinued by shutting off the current to the electrodes. At this point a small amount of coke may be thrown into the furnace on the upper surface of the slag to prevent reoxidation of the latter whereupon the furnace is allowed to cool down and the molten constituents therein to solidify.

In this connection it should be pointed out that it is characteristic of the method and means for heating the feed material by the process of this invention that a fused core consisting of highly reduced titaniferous slag and solid spheroidal-like buttons of iron metal is formed in the central region of the furnace, the core being surrounded by relatively loose partially reacted feed material which, in effect, acts as an insulating refractory around the fused core. It is this partially reduced feed material which may be used to insulate the crucible from the insulating brick walls of the furnace. Upon removal of the fused core from the furnace, the core is broken up from which the solid buttons of metallic iron are recovered. The highly reduced titaniferous slag has been analyzed as comprising from 90 to 120% titanium dioxide equivalent, from 2 to 15% metallic iron and about 1 to 5% ferrous oxide. Any residual metallic iron in the slag will be in the form of small iron beads scattered throughout the slag and hence may be substantially completely removed by milling the slag and subjecting the milled slag to a leaching treatment, magnetic separation treatment or a combination of both.

The partially reacted feed material which is recovered from any preceding heating cycle may be used not only as an insulating material but may be used either alone or mixed with a fresh charge of ore and carbon as a feed material for recharging the electric furnace for any succeeding smelting cycle.

By way of illustrating the invention, the following example is given:

Example

A furnace of the type hereinabove described was used. The furnace was preheated by arcing about 5 pounds of feed material in the furnace for a period of from 30 to 60 minutes until the furnace temperature was about 1800° C. The loose feed material which comprised 100 parts ilmenite ore and 25 parts coke, was then added to the furnace in increments of about 5 pounds every 15 minutes. Power input to the furnace was continued at a rate of about 35 kilowatts per hour and at the end of from 2 to 3 hours approximately 50 pounds of material had been added to the furnace. The total power input was substantially 100 kilowatt hours and the furnace temperature was maintained at from 1800 to 2200° C. The power was then cut off and a small amount of coke was thrown into the furnace to prevent reoxidation of the slag whereupon the furnace was allowed to cool overnight. Upon removal of the cooled fused core of highly reduced titaniferous slag and metallic iron from the crucible, the fused core was broken up into approximately one inch pieces and at the same time iron buttons of from 6 to 8 inches in diameter and weighing up to 20 pounds were recovered from the highly reduced titaniferous slag. The highly reduced titaniferous slag was then screened through a ten mesh sieve to separate the highly reduced slag from any partially reduced feed material. Approximately 9 pounds of highly reduced titaniferous slag were obtained. Four additional arc furnace runs were made and in each of the four additional runs the charge to the furnace consisted of ilmenite ore, coke and a portion of the partially reacted feed material from the preceding heat, the partially reacted material being analyzed prior to charging the furnace in order to complete the metallurgical balance. During the five furnace runs about 200 pounds of ilmenite were used. The slag analyzed as comprising substantially 100% titanium dioxide, 5% metallic iron and 1% ferrous oxide. The iron recovered as coarse metal from the slag weighed approximately 45 pounds i. e. approximately 84% of the iron oxides in the original feed material was recovered as metallic iron.

The highly reduced titanium slags recovered from the slag cores produced in the electric furnace were crushed to a particle size of approximately ¼ inch and then reduced to minus 30 mesh by passing the slag through grinding rolls after which the ground material was leached to reduce the iron content of the slag to a minimum and render the slag more suitable for chlorination. The metallic iron buttons formed as a byproduct in the smelting of the mixture of ilmenite and coke were found to be substantially similar, in composition, to the usual run of commercial pig iron and hence should be marketable as such.

In brief, the improved method of this invention for smelting ilmenite ore is characterized by the production of a highly reduced titanium oxide slag and metallic iron, the slag being substantially free of or at most having an exceptionally low iron content, the success of the process being dependent upon the critical ratio of the ore and coke mixture whereby the fluidity of the titaniferous slag is maintained during reduction of the iron values, thereby permitting the separation and coalescence of the iron as metallic iron buttons within the slag, and the production of a highly reduced titaniferous slag substantially free of iron and hence readily chlorinatible at relatively low temperatures to produce titanium tetrachloride efficiently and economically.

While this invention has been described and illustrated by the examples shown, it is not intended to be strictly limited thereto, and other variations and modifications may be employed within the scope of the following claims.

We claim:

1. A method of smelting a titaniferous iron material with a solid carbonaceous reducing agent in an electric furnace to produce and segregate a substantially iron-free highly reduced titaniferous slag and solid metallic iron which comprises: admixing the titaniferous iron material with from 17 to 25 parts carbonaceous reducing agent per 100 parts titaniferous iron material to reduce the titaniferous values in the ore to the reduced oxides of titanium and the iron values to metallic iron; charging the mixture of titaniferous iron material and carbonaceous reducing agent into an electric furnace; heating said mixture to a smelting temperature of from 1700° C. to 2300° C. by maintaining an electric arc above said mixture to form a fluid highly reduced titaniferous slag and reduced iron values in the form of molten metallic iron which coalesces from said fluid slag as a globule of segregated molten iron metal beneath the surface of said fluid slag; periodically adding additional charges of admixed titaniferous iron material and carbonaceous reducing agent to said furnace in the ratio of from 17 to 25 parts of the latter per 100 parts of the titaniferous iron material to form additional fluid highly reduced slags and globules of molten iron metal; subsequently cooling and solidifying the contents of said furnace; and thereafter separating the solidified globules of metallic iron from the highly reduced titaniferous slag.

2. A method of smelting an ilmenite ore with coke in an electric furnace to produce and segregate a substantially iron-free highly reduced titaniferous slag and solid metallic iron which comprises: admixing the ilmenite ore with from 17 to 23 parts coke per 100 parts ore to reduce the titaniferous values in the ore to the reduced oxides of titanium and the iron values to metallic iron; charging the mixture of ilmenite ore and coke into an electric furnace; heating said mixture to a smelting temperature of from 1700° C. to 2300° C. by maintaining an electric arc above said mixture to form a fluid highly reduced titaniferous slag and reduced iron values in the form of molten metallic iron which coalesces from said fluid slag as a globule of segregated molten iron metal beneath the surface of said fluid slag; adding a new charge of a substantially identical mixture of ilmenite ore and coke to said fluid slag, thereby cooling said slag and quenching said globule of molten metallic iron; heating the new mixture of materials in said furnace to form a second body of fluid highly reduced titaniferous slag and a second globule of segregated molten iron metal beneath the surface of said second body of fluid slag; periodically introducing additional substantially identical charges of admixed ilmenite ore and coke to said furnace to form additional fluid highly reduced slags and globules of molten iron, and to sequentially cool the previously formed fluid slags and globules of molten iron metal; subsequently cooling and solidifying the contents of said furnace; and thereafter separating the solidified globules of metallic iron from the highly reduced titaniferous slag.

3. A method of smelting an ilmenite ore with coke in an electric furnace having a fixed electrode and a movable electrode to produce and segregate a substantially iron-free highly reduced titaniferous slag and solid metallic iron which comprises: admixing the ilmenite ore with from 17 to 23 parts coke per 100 parts ilmenite ore to reduce the titaniferous values in the ore to the reduced oxides of titanium and the iron values to metallic iron; charging the mixture of ilmenite ore and coke into an electric furnace; heating said mixture to a smelting temperature of from 1700° C. to 2300° C. by maintaining an electric arc above said mixture to form a fluid highly reduced titaniferous slag and reduced iron values in the form of molten metallic iron which coalesces from said fluid slag as a globule of segregated molten iron metal beneath the surface of said fluid slag; adding a new charge of a substantially identical mixture of ilmenite ore and coke to said fluid slag, thereby cooling the slag and quenching said globule of molten metallic iron; heating the new mixture of materials in said furnace to form a second body of fluid highly reduced titaniferous slag and a second globule of segregated molten iron metal beneath the surface of said body of fluid slag; periodically introducing additional substantially identical charges of admixed ilmenite ore and coke to said furnace to form additional highly reduced fluid slags and globules of molten iron, and to sequentially cool the previously formed fluid slags and globules of molten iron metal; maintaining the temperature in the furnace within the range of from 1750° to 2300° C. throughout successive charging cycles by adjusting the movable electrode relative to the fixed electrode; and thereafter separating the solidified globules of metallic iron from the highly reduced titaniferous slag.

No references cited.